Feb. 10, 1970    U. P. HANSON    3,494,440
DEVICE FOR MOVING HEAVY OBJECTS UP AND DOWN STAIRS
Filed Jan. 24, 1968    3 Sheets-Sheet 2

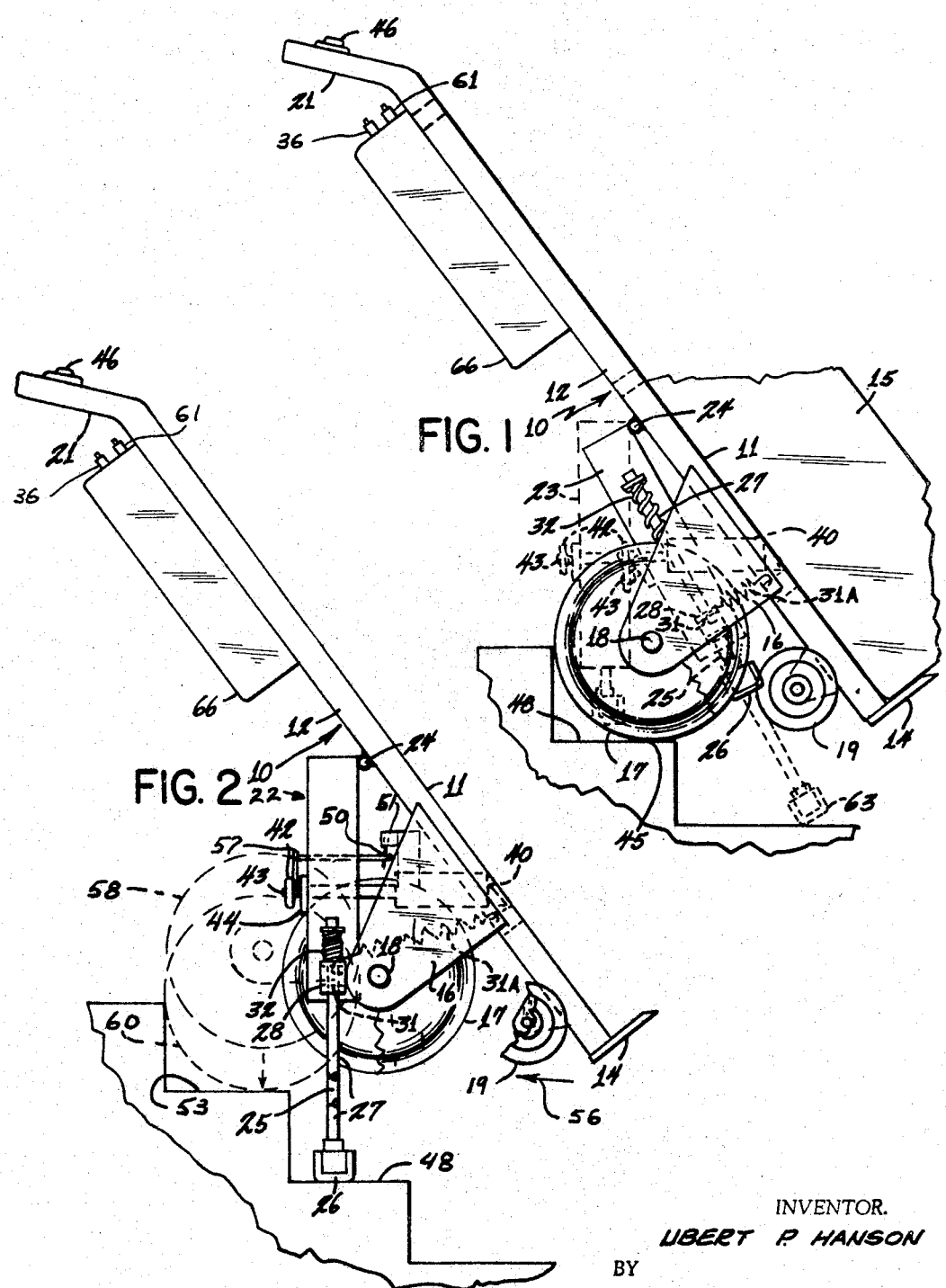

INVENTOR.
UBERT P. HANSON
BY
Dugger, Peterson, Johnson & Westman
ATTORNEYS

Feb. 10, 1970  U. P. HANSON  3,494,440
DEVICE FOR MOVING HEAVY OBJECTS UP AND DOWN STAIRS
Filed Jan. 24, 1968  3 Sheets-Sheet 3

INVENTOR.
UBERT P. HANSON
BY
Dugger, Peterson, Johnson & Westron
ATTORNEYS

United States Patent Office 3,494,440
Patented Feb. 10, 1970

3,494,440
DEVICE FOR MOVING HEAVY OBJECTS UP AND DOWN STAIRS
Ubert P. Hanson, 29 Penn Ave. S., Minneapolis, Minn. 55405
Filed Jan. 24, 1968, Ser. No. 700,214
Int. Cl. B62d 57/02; B62b 5/02
U.S. Cl. 180—8       14 Claims

ABSTRACT OF THE DISCLOSURE

A stair climbing hand truck which has mean for supporting heavy objects thereon and which is mounted on wheels. The handtruck mechanism includes a support pedestal that can be extended to remove the load from the wheels and which is pivotally mounted with respect to the handtruck so that when the weight is on the support pedestal the handtruck can be moved to position the truck wheels over the next higher or lower step, after which the pedestal is released and the weight is again supported on the wheels but on a different step from the previous step. This gives a stair climbing or descending ability to the handtruck. The unit utilizes pneumatic cylinders for extending the pedestal and for moving the wheels in a transverse direction. The unit is interlocked so that the cycle is automatic once it is initiated either for ascending or descending stairways.

BACKGROUND OF THE INVENTION

Field of the invention

The present invention relates to stair-climbing handtrucks or vehicles which have a capability of moving heavy objects up and down stairways.

Description of the prior art

In the art of moving heavy objects with handtrucks, there have been power trucks which operate on a principle of attempting to power a tread-like mechanism up and down stairways, as well as braked power trucks and trucks which have a power drive directly to the wheels. However, on real heavy objects, such as coin-operated vending machines and the like, these trucks usually do not possess the capabilities of climbing stairways because the stair rise is usually too high to permit driving up with ordinary wheels and the tread type are prone to slippage which can cause a great deal of damage.

The problem with moving heavy objects such as coin-operated vending machines is extremely great because when installing or removing these machines it will usually tie up at least three or four men and a truck to move a machine perhaps only up two or three or four stairs. The present device is a safe, economical and extremely rugged unit which will climb stairs while supporting a very heavy load and does it in a manner which prevents accidents while permitting single man operation.

SUMMARY OF THE INVENTION

The present device relates to a vehicle which will climb or descend stairs through the use of a movable pedestal which will support load independently of the normal supports for the vehicle and will pivot to move the vehicle from one step to another step while the support member supports the load.

BRIEF DESCRIPTION OF THE DRAWINGS

FIGURE 1 is a side elevational view of a stair-climbing handtruck made according to the present invention;

FIGURE 2 is a side elevational view of the device of FIGURE 1 showing the handtruck in an intermediate stair-climbing position;

DESCRIPTION OF THE PREFERRED EMBODIMENTS

Figure 4:
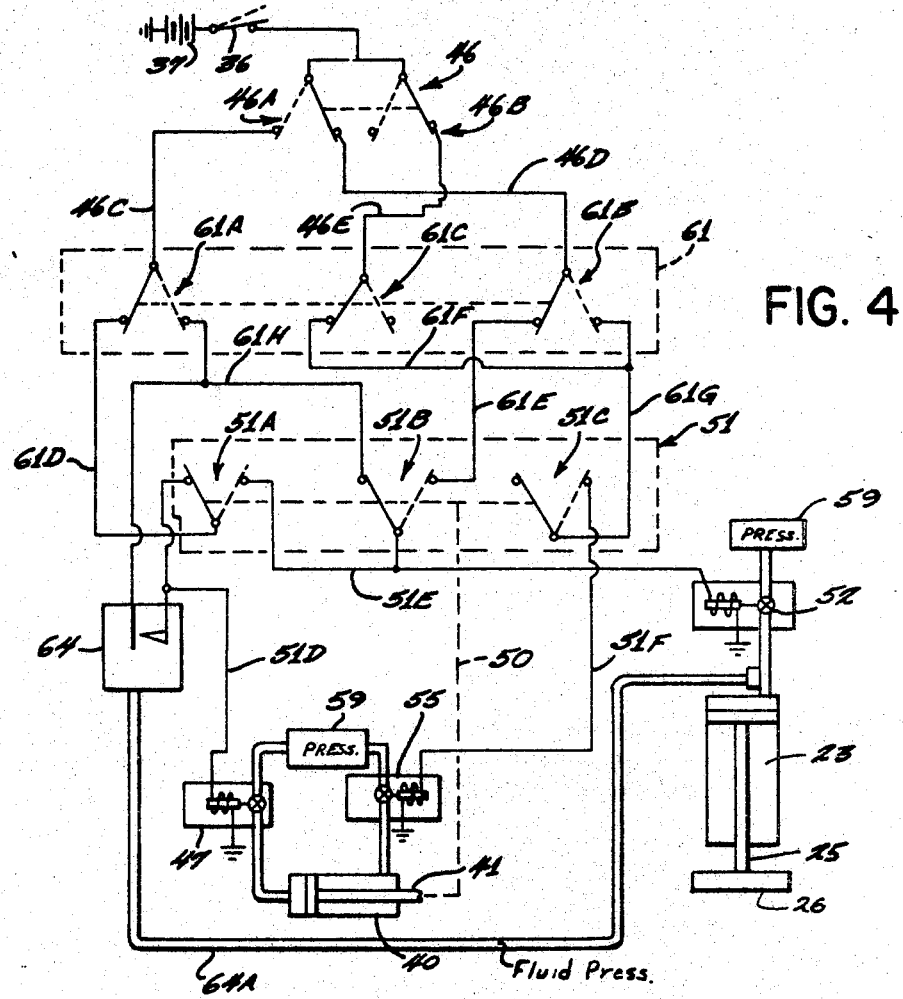
FIGURE 4 is a part schematic view of the components used for the stair-climbing handtruck of the present invention.

A stair-climbing handtruck for carrying heavy objects illustrated generally at 10 includes a truck frame 11 which is of usual design having spaced apart side members 12, 12 and suitable crossmembers 13. A bottom load shoe 14 is attached between the side member 12, 12 and is of size to engage a portion of the load illustrated at 15, such as a heavy pop-vending machine or similar heavy object. Suitable straps and other load attaching devices are used with this frame for securing and helping to balance the load.

Figure 3:
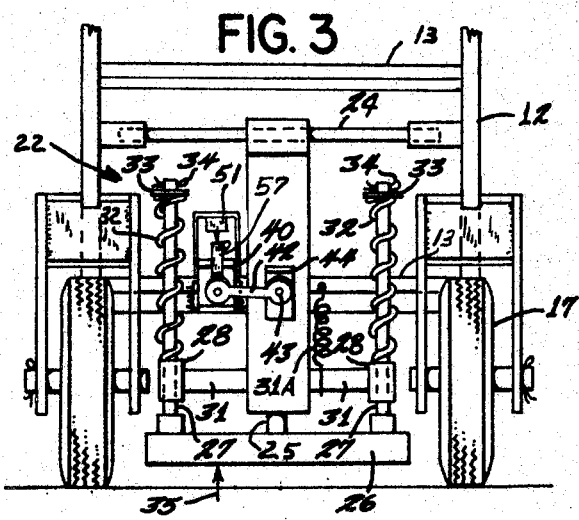
FIGURE 3 is a fragmentary rear view of the device of FIGURE 1.

The side members 12, 12 each mount a wheel housing or bracket 16 which is used to rotatably mount a wheel 17 on an axle 18. The wheels 17 are rotatably mounted on their axles 18 for free rotatable movement and are used for normally conveying the load with the cart. The side members 12, 12 have handle grips 21 as shown for an operator to use in moving the load. Small auxiliary wheels 19 are rotatably mounted on each side of the frame close to the load shoe to help in tipping loads onto the cart and to provide a stable support when wheeling the load. Normally, the load will be rolled with the handtruck in a conventional manner. However, carrying heavy loads upstairs is very much a problem. With heavy vending machines such as pop venders or milk venders, or the like, four men are usually required for moving the units up and down stairs. In order to facilitate this movement so that moving a vending machine such as that shown at 15 is a one-man operation, suitable step-climbing mechanism illustrated generally at 22 is used. As shown in FIGURE 1, the stair-climbing mechanism includes a first lift cylinder 23 which is pivotally mounted about a member 24 extending between the side frame members 12. The cylinder 23 has an internal piston and a longitudinally extending piston rod 25 that moves generally in up-and-down direction. The rod 25 is attached to a load carrying foot or pedestal 26 that extends transversely a substantial distance as shown in FIGURE 3. This load carrying foot in turn has a pair of guide rods 27, 27 fixedly attached thereto and extending upwardly through guide sleeves 28, 28. The rods 27 are slidably mounted in the guides 28. The guide sleeves 28 in turn are fixedly attached to a crossmember 31 that is in turn fixedly attached to the cylinder assembly 23. The foot 26 thus moves with cylinder 23 about the cylinder's pivot.

On the opposite side of the guide sleeves 28 from the foot member 26, a pair of springs 32 (one on each rod) are mounted over the rods 27. Springs 32 bear against the upper surface of each of the guide sleeves 28 and against a provided washer or stop 33 on each rod that is held in place with a suitable pin 34. Thus the foot 26 is urged in direction as indicated by the arrow 35 under the force of the springs 32.

Thus it can be seen that the pedestal or foot 26 moves with the cylinder rod 25. When fluid under pressure is introduced into the cylinder, the piston rod 25 will be extended and force the foot 26 downwardly against the action of the springs 32. The springs 32 also return the piston rod 25 to retracted position when the pressure is removed from cylinder 23.

In addition, a horizontal cylinder-piston assembly 40 is mounted and self-supported onto one of the crossbars 13 between the frame members 12, 12 and has a rod 41 which can be extended or retracted (it is a double acting cylinder) with fluid under pressure. The outer end of the rod 41 is operatively connected to a pivoting arm 42 that in turn is connected through a ball joint 43 to a block 44 attached to the cylinder 23. As stated previously, the cylinder 23 is pivotally attached about a horizontal axis to a crossmember 24. Thus when the rod 41 of cylinder 40 is extended or retracted, the cylinder 23 and foot 26 will be caused to pivot about member 24. The ball joint and turning of the cylinder rod in the cylinder are sufficient to compensate for misalignment. As the rod 41 moves, the cylinder 23 and pedestal 26 move with it. A spring 31A is used for urging the rod 41 to retracted position.

The cylinders 23 and 40 are fluid cylinders controlled through solenoid operated valves. A schematic diagram of the controls is shown in FIGURE 4 and will be explained as the cycling is discussed.

ASCENDING STAIRS

To explain climbing stairs 45, the unit is assumed to be already on a step 48 as shown in FIGURE 1 and the switches are as shown in solid lines in the schematic diagram of FIGURE 4. An on-off switch 36 will be on. A cycle start switch 46 will be as shown in solid lines (this is a double pole double throw switch that is spring biased to its solid line position). A cycle reversing switch 61, which is a triple pole double throw switch, (three sets of contacts) is in an "up the stair" position as shown in solid lines and a triple pole position control limit switch 51 is as shown in solid lines. The position of the control switch is in response to movement of the piston and rod of horizontal or lateral cylinder 40 and its solid line position is with the rod 41 in its retracted position.

The wheels 17 of the vehicle are on a step or surface 48 and the rods of cylinders 23 and 40 are both retracted as shown. Then, the cycle initiating switch 46 is moved to a "start cycle" position (the button is pushed). The first contacts 46A are then moved to the dotted position. The contacts 46B are not used in the start cycle position, but only at the finish of the cycle.

A circuit is then closed from the battery or power source 37, through the contacts 46A in their dotted position through a line 46C to the closed contacts 61A of switch 61. This is the solid position as shown in FIGURE 4. Contacts 61A connect power through a line 61D to contacts 51A of the control switch 51. Contacts 51A direct power through a line 51D to a spring return three-way solenoid valve which is energized, and then directs fluid under pressure from a source 59 to the horizontal cylinder 40. This extends the rod 41 of the cylinder. The rod 41 pivots the lift cylinder 23 and the foot assembly 26 to position as shown in dotted lines at FIGURE 1 away from the base of the vehicle. The foot assembly 26 then lies parallel to and spaced above the stair 48 on which the wheels 17 are resting. When the rod of cylinder 40 is extended to this position with the foot 26 over step 48, an arm 50 carried by the rod 41 trips the triple pole switch 51 to its dotted position. The switch 51 is mounted on a frame to the cylinder 40 and has an actuator finger that is tripped by arm 50 attached to rod 41. Contacts 51A then complete a circuit from line 61D to a three-way solenoid valve 52 through a line 51E. The valve, when energized through the line 51E as just described, directs fluid under pressure from the source of fluid under pressure 59 to the lift cylinder 23.

Rod 25 of lift cylinder 23 extends, pushing the foot member 26 against the step 48 and exerting a sufficient force to lift the entire truck and load in upwardly direction until the truck reaches the position as shown in solid lines in FIGURE 2. As can be seen, the wheels 17 are positioned so that they are above the level of the next upper step 53. When the truck is raised to this position, the switch 46 is released by the operator. The spring-biased switch 46 returns to its solid line position at this time. Solenoid valve 47 is relaxed because the circuit is broken to this solenoid due to the fact that contacts 46A move to their solid position. A circuit is then completed through the solid line position side of contacts 46A through a line 46D to contacts 61B of switch 61. These contacts, being in solid line position, complete a circuit through line 61E to contacts 51B (which are now in their dotted position) to keep the solenoid valve 52 energized through line 51E so that the cylinder 23 is kept under pressure and the load is still supported.

At the same time, a circuit is completed through the contacts 46B (solid position), through a line 46E to contacts 61C (solid position), and then through a line 61F to a line 61G and then to contacts 51C (dotted position) and thus through a line 51F to a solenoid valve 55, which when energized, directs fluid under pressure from the source 59 to the retracting side of the cylinder 40. This moves the rod 41 to its retracted position. This is done while the load is being supported because solenoid valve 52 is energized at the same time. As this retarction takes place, the foot 26 of cylinder 23 is supporting a load on the step 48. The retraction of the cylinder rod 41 thus brings the load and truck frame back toward the cylinder 23. This is in direction as indicated by arrow 56 in FIGURE 2.

In doing so, the wheels 17 then come to a position as shown in dotted lines at 58 in FIGURE 2 above the step 53 and vertically aligned therewith. The wheels are raised slightly above the step. The operator provides a balancing force to keep the frame of the truck parallel to its original plane.

When the rod 41 is fully retracted, a lug 57 of the arm 50 contacts and trips the finger of switch 51 to move the switch back to its solid position as shown in the schematic diagram (contacts 51A, 51B and 51C moves to solid position). This breaks the circuit to solenoid valve 52 and lets the rod for cylinder 23 retract as the fluid will exhaust through the valve 52 when it is relaxed. In a three-way solenoid operated valved such as those used, when the valve is not energized it opens the path to exhaust the cylinder. The solenoid valve 55 is also relaxed and the unit is in its starting position.

The solenoid valves 47, 52 and 55 can be a type V53A made by Skinner Electric Valve Division, New Britain, Conn.

As the rod 25 retracts under load, the wheels 17 will settle down onto step 53 as shown in dotted lines at 60 and the unit will be positioned just like it is in FIGURE 1 except one step higher. The controls have been reset by lug 57 at this time and the cycle can be repeated by pressing the switch 46 to move the contacts to dotted position to climb another step. The cycle is repeated for the required number of steps.

DESCENDING STAIRS

For descending stairs the selector switch 61, which is a triple pole switch and is mounted on a housing 56, is placed in its dotted position. This is a snap triple pole switch that is manually operated. To initiate the descending cycle, or the "down the stairs" cycle, the switch 46 is pressed to move it to its dotted position again. The only contacts used in the "descending cycle" of switch 46 are 46A.

In dotted position of switch 61 and also switch 46 a circuit is completed from electrical source 37 through line 46C to the contacts 61A which are in their dotted position, through a line 61H to one side of contacts 51B (which are in the solid position) and then through these contacts to energize solenoid valve 52 through line 51E. This causes the rod 25 of the cylinder 23 to extend as fluid under pressure is directed from the fluid source 59 so that the foot 26 goes down and engages the step below the step on which the wheels 17 are resting. This is shown at 63 in FIGURE 1. The load is then lifted by the foot 26 (wheel 17 will raise from step 46) and the operator will provide the balance force on the cart handles necessary to permit this lifting. After the pressure in the cylinder 23 has raised above a preselected amount, a pressure actuated weight control switch which is connected into the fluid line leading to cylinder 23 with a sensing line 64A will close a circuit connected through line 61H to line 51D thus energizing valve 47. The pressure switch 64 is made so that it will not operate until the pressure is sufficient so the load is raised. If the pressure in the pressure source is too low, the cycle will not continue for safety reasons. The switch is connected so that the pressure in the fluid line leading to the cylinder 23 and thus the pressure in sensing line 64A has to raise above a preselected level, which will be set high enough to insure raising the load on the truck. The switch 64 is a commercially available unit shown only schematically and the pressure required to close the switch can be adjusted.

If the pressure in line 64A is sufficient to make the pressure switch 64 close, the valve 47 is energized and the rod of the horizontal cylinder 40 will extend.

The foot 26 is provided with an anti-slip surface such as a covering of rubber belting that has gripping projection on its surface. This prevents the foot from slipping or moving on the stairs.

Because the foot 26 will be supporting the load on a step lower than that on which the wheels were positioned, this means the entire truck and load will move forwardly in direction opposite that indicated by arrow 56 in FIGURE 2 until the wheels are above the stair on which the foot is resting as shown in solid lines in FIGURE 2. Then the arm 50 will trip the switch 51 so the contacts of this switch go to dotted position. The valve 52 will then be de-energized to permit the cylinder 23 to exhaust. The cylinder rod 25 will return to its retracted position, lowering the wheels down onto the step on which the foot 26 is resting. The springs 32 and the load will bring the foot 26 all the way up to its home position. The switch 46 is held in its dotted position until near the end of the descent stroke. Then the switch 46 is released and permitted to go to its solid position, and contacts 46A, the only contacts operating, complete a circuit through line 46B to contacts 61B, which are in their dotted position, and then through the line 61G to contacts 51C which are also in their dotted position and then through line 51F to the solenoid valve 55. When the solenoid valve 55 is energized, fluid under pressure will be directed to retract the rod 41 of cylinder 40 back to its home position. As soon as the rod is retracted the switch 51 will be returned to its solid position by lug 57 breaking the circiuts to all of the solenoid valves. The unit will again be ready to recycle down the stair to the next lower step.

In resume, when the switch 61 is set to its dotted position, for down the steps, upon pushing the switch 46, the rod of lift cylinder 23 will extend to support the load and when the pressure in the cylinder gets sufficient to support the load, it will close the pressure or weight control switch 64 causing the rod of horizontal cylinder 40 to extend and positioning the truck and load forwardly so that it overlies the next step down, after which the load will automatically be lowered because of the tripping of the switch 51 when the rod of cylinder 40 extends. The cycle can be repeated to "walk" the heavy load down the steps safely.

A support housing 66 is used for mounting all of the solenoid valves, terminal blocks, battery or electrical source and the fluid source. The battery 37 is a dry cell that provides the power for operating the solenoid valves and the source 59 of high pressure fluid is a pressurized cylinder of carbon dioxide or similar compressed fluid which will provide the source of fluid under pressure. Conventional pressure regulators for changing the high pressure to usable pressure will be used. The tank and regulators are merely fastened inside the housing 66. A remote cylinder of fluid under pressure and a flexible hose connector to the valves can also be used. The remote cylinder would give a larger available supply of fluid under pressure. Hydraulic fluid under pressure can also be used to activate the cylinders.

The stair climbing truck can be a complete unit self-contained in and of itself, completely portable and easily made and operated. The unit will climb or descend stairs merely by flipping a selector switch and then initiating the cycle.

The switch 51 is a limit switch that is actuated when the rod of horizontal cylinder 40 reaches one or the other of its extreme positions.

Referring to FIGURES 5, 6 7 and 8, the handtruck is shown in a slightly modified form which permits the use of an adjustable load shoe in addition to the regular load shoe. The frame comprises side numbers 12, 12 and crossmembers 13 that hold the frame together, together with the load shoe 14. The wheels 17 are mounted as before to the frame, and the stair-climbing mechanism is also utilized, but is omitted from these views for the sake of clarity.

Figure 6:
FIGURE 6 is a sectional view taken as on line 6—6 in FIGURE 5.
Figure 5:
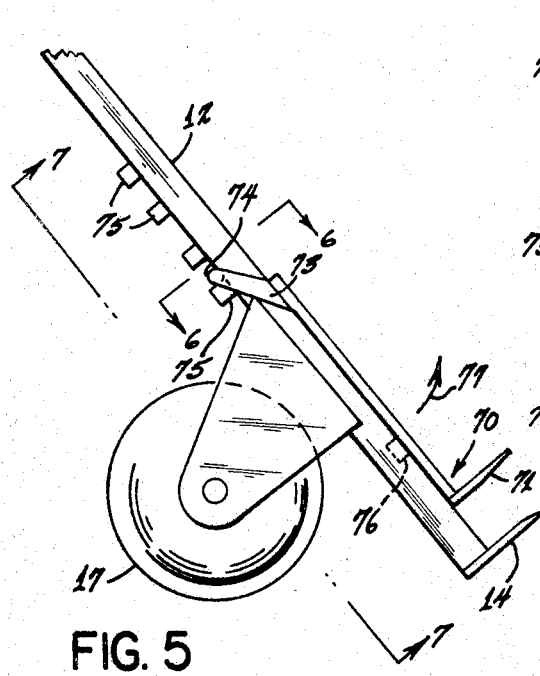
FIGURE 5 is a side elevational view of a modified form used to change position of the load shoe for changing the center of gravity of the unit.
Figure 7:
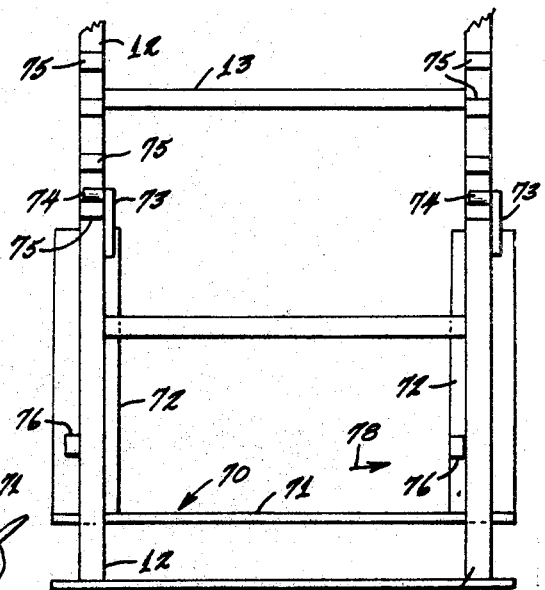
FIGURE 7 is a sectional view taken as on line 7—7 in FIGURE 5.
Figure 8:
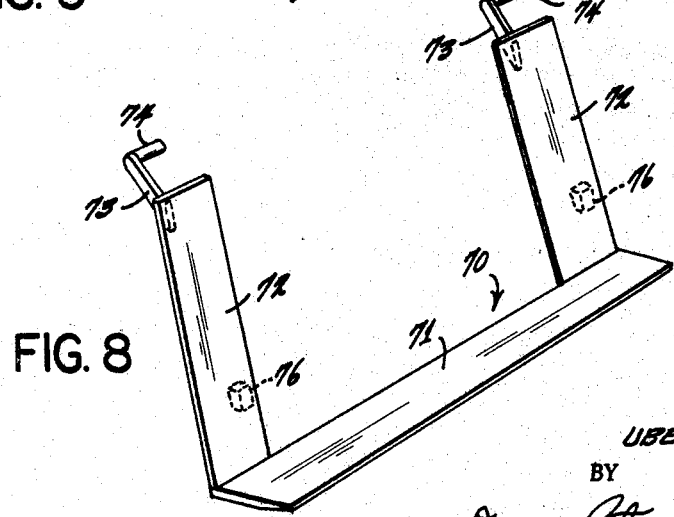
FIGURE 8 is a perspective view of the adjustable shoe.

The adjustable load shoe assembly illustrated generally at 70 includes a load support shoe 71, and a frame for the shoe comprising a pair of plate-like support members 72 which are welded to the shoe at the opposite ends thereof, and align with the frame members 12, 12 and can be seen in FIGURES 6 and 7. The plate members 72 in turn have arms 73 welded thereto at their upper ends, and the arms 73 extend rearwardly from the plate members 72, and the pins extend substantially parallel to the plate members, but are spaced from the plate members a distance greater than the width of the frame members 12, 12. A plurality of support blocks 75 are welded in alignment on each of the frame members 12, 12 on the back side thereof. In addition, stop dogs 76 are attached to each of the plate members. As shown, the pins pins 74 are made so that they will rest on the top surface of aligning blocks 75 on opposite one of the frame members 12, and the force of gravity will cause the load shoe to move against the frame members 12, 12 and the plate members 72 will also move against the frame members. This then locks the unit on the frame so that the pins 74 cannot come off blocks 75 and a load can be supported on shoe 71. It can be seen that the arms 73 are on the same side of the frame members 12, 12 so that by pivoting the shoe 71 and the plate members 72 in direction indicated by the arrow 77 until the stop dogs 76 are clear of the frame members 12, 12 the entire unit 70 can be slid in direction indicated by the arrows 78 in FIGURE 6 so that the pins disengage the blocks 75. Then the shoe can be raised to the next higher blocks 75, if desired, or can be removed so that the regular load shoe 14 can be used. By providing the requisite number of blocks 75 the necessary adjustments for changing the center of gravity of the supported load with the respect to the wheels 17 can be made so that the load will always be balanced accurately to make climbing of stairs much easier.

The adjustable shoe gives greater versatility to the truck because it makes it easier to handle and easier to balance. The support members 72 can be braced or made into other types of support frames. In addition, other ways of adjustably fastening the auxiliary shoe 71 to the frame members can be used, if desired. The concept is to have a fixed shoe 14 which is usable in a large number of cases, but also having an auxiliary shoe 71 which can be adjusted where the center of gravity of the article being carried differs greatly from a normal center of gravity.

The task of climbing up and down stairs is thus greatly eased and this increases the safety of moving heavy objects as well as reducing the number of men required to move an object up and down stairs.

The handtruck can be used, of course, like any other handtruck for transporting loads over flat surfaces. The small wheels help support loads when moving on flat surfaces, and the adjustable shoe also has utility to better balance loads even when the load is not traversing stairs.

What is claimed is:

1. A handtruck vehicle for transversing a flight of steps comprising a pair of spaced parallel frame members including handle means for guiding the truck, transport means for supporting said frame for movement over a planar surface, a support member, means to pivotally mount said support member on said frame for movement in a substantially vertical plane between said spaced frame members, said support member being selectively extendable and retractable in up and down direction, first power means for extending the support member in a downwardly direction, second power means to selectively move said support member relative said frame about its pivot to a first position spaced from said frame and to a second position adjacent said frame, said support member being extendable a distance more than the rise of a step in the flight of steps and control means to selectively operate said first and second power means whereby said support member will be moved about its pivot by said second power means to a position overlaying a supporting surface, said control means being operable to actuate said first power means to extend said support member to support said vehicle on the support member and subsequently actuate the second power means to move the vehicle and the support member relative to each other to a position with the transport means over a supporting surface other than the surface on which the transport means originally rested, and means to retract the support member.

2. The combination as specified in claim 1 wherein said control means cause the first power means to extend the support member to contact a surface lower than the step supporting the vehicle, and to support the vehicle on the lower surface and subsequently actuate said second power means to move the vehicle relative to the support to position wherein the transport means are above said lower surface and thereafter release said first power means to permit said support member to retract.

3. The combination as specified in claim 1 wherein said control means first cause the second power means to pivot said support member to position overlying a step on which the transport means for the vehicle are resting, and then energize said first power means to extend said support member and lift said vehicle, and subsequently actuate said second power means in direction to move said vehicle to position wherein the transport means of said vehicle are above the step on which the support members is resting.

4. The combination as specified in claim 1 including, a load carrying shoe adjacent the bottom of said frame, and wherein said transport means comprise wheel means rotatably mounted with respect to the frame.

5. The combination as specified in claim 1 wherein said first and second power means comprise fluid actuated cylinder and piston assemblies.

6. The combination as specified in claim 1 wherein said transport means are wheel means for supporting said frame, and a load support shoe mounted adjacent a lower end of said frame, and means to adjust the position of said load support shoe with respect to the frame to change the center of gravity of a load supported on said support shoe with respect to the support wheels.

7. The combination as specified in claim 1 wherein said control means include a limit switch, and means movable with said second power means and operative to actuate said limit switch in response to predetermined positions of said second power means.

8. The combination as specified in claim 1 wherein said control means include a selector switch, said selector switch having two positions, one of said positions being operable to connect circuitry for moving the vehicle up the steps, and the other of said positions being operable to connect circuitry for moving said vehicle down the steps.

9. The combination as specified in claim 5 and a housing on said vehicle, said housing supporting a portable source of fluid under pressure, and said control means including means to control flow of fluid under pressure from said source to said cylinders.

10. The combination as specified in claim 2 wherein said first power means is a fluid pressure actuated cylinder having an extendable rod, a source of fluid under pressure, said control means including means to control the flow of fluid under pressure to said cylinder, and a switch in said control means responsive to pressure in said fluid pressure actuated cylinder, said pressure responsive switch providing cutout means to prevent the control means from subsequently powering said second power means until the pressure in said fluid pressure actuated cylinder is sufficient to support the vehicle and any load thereon.

11. The combination as specified in claim 1 and spring means urging said support member to retract.

12. The combination as specified in claim 11 and bias means urging said second power means to position wherein the support member is moved about its pivot to its second position adjacent said frame.

13. The combination as specified in claim 7 and cycle initiating switch means, said cycle initiating switch means having a cycle start position and a normal position, and interlock means between said cycle initiating switch means and said power means operative to return said second power means to position wherein it moves the support member adjacent to said frame whenever the cycle operating switch means is in its normal position.

14. The combination as specified in claim 13 wherein said limit switch means controlled by said second power means is actuated to disable said first and second power means when the cycle initiating switch means is in normal position, and the second power means has moved the support member to position adjacent said frame.

References Cited

UNITED STATES PATENTS

| 2,192,396 | 3/1940 | Burch | 280—5.3 X |
| 3,053,546 | 9/1962 | Muirhead | 280—5.3 |
| 3,269,478 | 8/1966 | Joslyn | 180—8 |
| 3,338,586 | 8/1967 | Kirlin | 280—5.3 |
| 4,417,831 | 12/1968 | Lake | 280—5.3 X |

RICHARD J. JOHNSON, Primary Examiner

U.S. Cl. X.R.

280—5.3